Dec. 23, 1941.   J. J. SMITH   2,267,689
SALES PROMOTION SYSTEM OF ADVERTISING AND APPARATUS
FOR CARRYING IT INTO EFFECT
Filed April 1, 1940   2 Sheets-Sheet 1
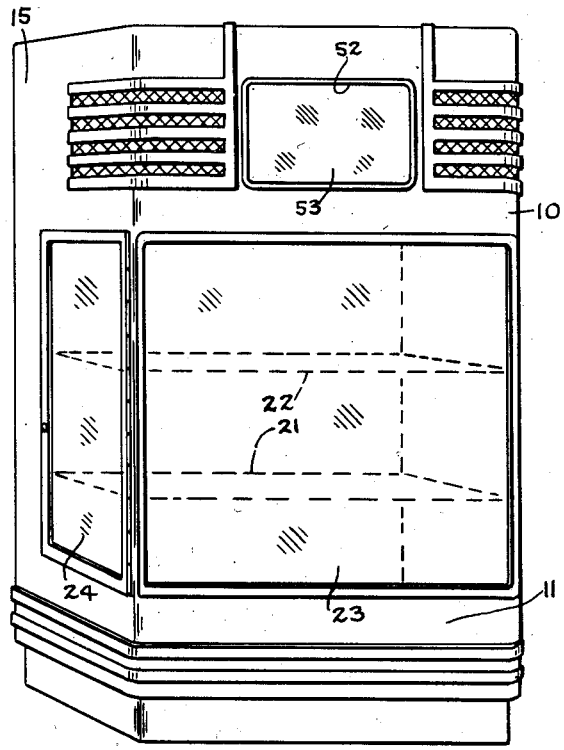
Fig.-1
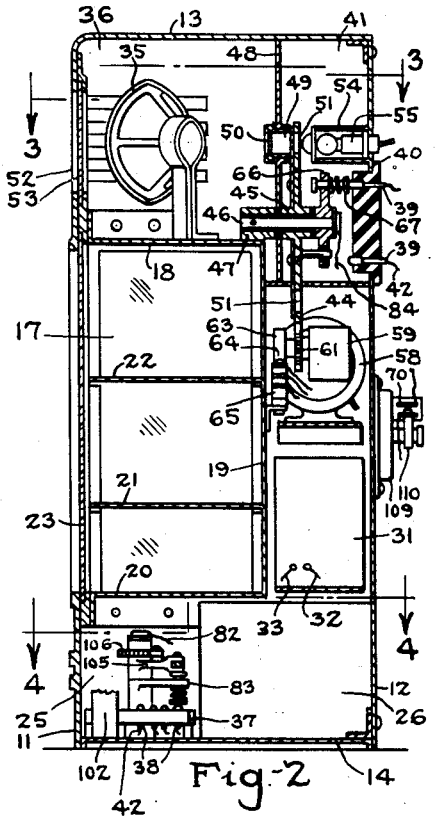
Fig.-2
Fig.-3
Fig.-4
Inventor:
John J. Smith.
By R. A. Whiteley
Attorney Dec. 23, 1941.　　　　J. J. SMITH　　　　2,267,689
SALES PROMOTION SYSTEM OF ADVERTISING AND APPARATUS
FOR CARRYING IT INTO EFFECT
Filed April 1, 1940　　　2 Sheets-Sheet 2

Inventor:
John J. Smith.
By R. C. Whiteley
Attorney.

Patented Dec. 23, 1941

2,267,689

UNITED STATES PATENT OFFICE 2,267,689

SALES PROMOTION SYSTEM OF ADVERTISING AND APPARATUS FOR CARRYING IT INTO EFFECT

John Jay Smith, Chicago, Ill., assignor of one-third to Charles G. Sharp and one-third to Robert C. McClintock, both of Minneapolis, Minn.

Application April 1, 1940, Serial No. 327,367

4 Claims. (Cl. 88—27)

My invention relates to a sales promotion system of advertising, and to apparatus for carrying it into effect.

Modern advertising is effected by transmitting the advertiser's message both through the eye and the ear. In the former and older eye advertising this is done by periodical publications, outdoor billboards, mail circularizing and even motion picture display. As an appeal to the ear, modern radio has become extremely important in advertising. Although the theory of advertising, that constant repetition of the name and merits of a good product gradually grips the public consciousness and produces sales, is practically sound, there is one serious difficulty with all advertising of which I have knowledge to the present time, and that is that the advertiser's message in the main is not carried to the prospective purchaser at the point where he may make his purchase.

It is a chief object of my invention to carry the advertising message made current with the public by general advertising directly to the purchaser at the point where he would make his purchase, and both to the eye and to the ear of the purchaser, to accomplish the most effective possible sales promotion of a meritorious product.

Hence, it is an important object of my invention to provide means to be installed conspicuously positioned in space within retail stores, such as grocery stores, drug stores, hardware stores and the like, which will convey to the prospective purchaser, visually by means of suitable slide display and audibly by phonographic reproduction, the same message which has been publicized through general advertising of the type above noted.

It is a further object of my invention to provide a cabinet which may be formed as a suitable display cabinet having a display window upon which will be shown a series of advertising displays, either as cards successively shown in the window, or as messages thrown on the window by a strong light through properly positioned slides.

It is a further object of my invention to provide automatic phonographic means whereby a series of phonographic records will be successively played in timed relation to the visual displays so that while the visual display is presented the phonographic record will carry the advertiser's message to the ears of the customers.

It is a further object of my invention to provide means whereby the series of displayed matter and the series of phonographic records will be synchronously operated so that the proper display matter will be shown in conjunction with the phonographic matter applying thereto.

The full objects and advantages of my invention will appear in connection with the detailed description thereof and the novel means by which the above noted advantageous results are obtained will be particularly pointed out in the claims.

In the drawings illustrating an application of my invention in one form:

Fig. 1 is a part perspective elevation view of a cabinet embodying means for carrying out my invention.

Fig. 2 is a longitudinal sectional elevation view taken through the cabinet.

Fig. 3 is a sectional plan view taken on line 3—3 of Fig. 2.

Fig. 4 is a sectional plan view taken on line 4—4 of Fig. 2.

Figure 5:
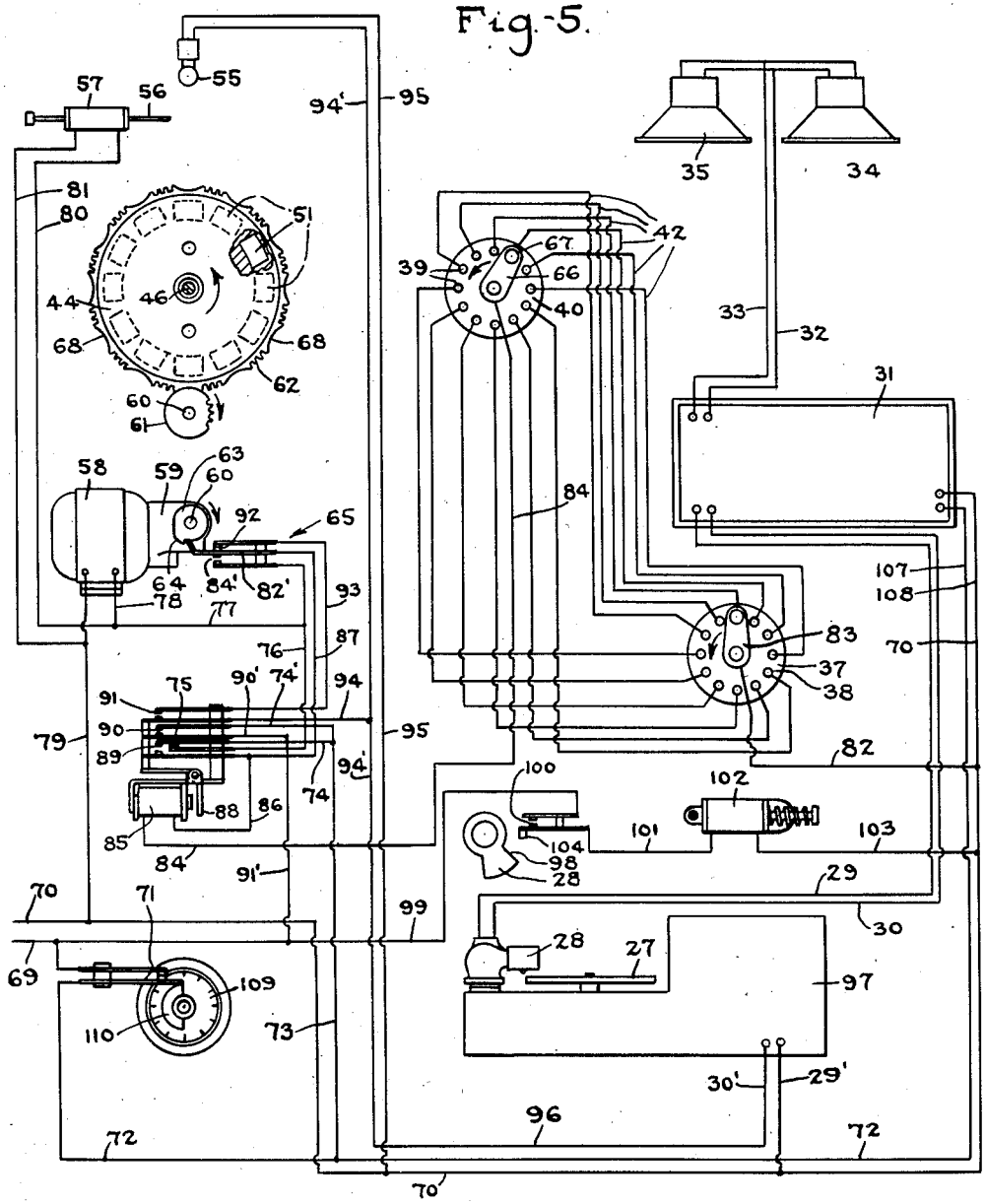
Fig. 5 is a general wiring diagram showing the manner in which the display matter and the phonographic records are synchronously operated for successive simultaneous presentation of each.

As shown a cabinet 10 is provided having a front wall 11, a rear wall 12, top wall 13, bottom wall 14 and side walls 15 and 16. A chamber 17 is formed by means of walls indicated generally at 18, 19 and 20. This chamber has shelves 21 and 22 and a glass front 23 and glass side panels 24. Upon the floor 20 and shelves 21 and 22 the articles which are being advertised may be displayed. Below partition 20 is a chamber 25 which occupies the full cross sectional area of the cabinet, as clearly shown in Fig. 4. Within the chamber 25 is located a multiple disc, automatic phonograph unit. The construction and operation of this device is well known and is described and referred to here in detail only to the extent necessary to show how it coordinates and synchronizes with the display means. In response to this mechanism, the disc supply is indicated at 26, the rotatable playing table at 27, the reproducing arm at 28 carrying wires 29 and 30 which connect with the amplifier 31 and that in turn connects by wires 32 and 33 with twin loud speakers 34 and 35, which are shown located toward the corners and directed toward grills opening from the upper part of a top chamber 36, as shown in Figs. 2 and 3. A commutator 37 is located in chamber 25 with a series of contact posts 38 in circuit connection with contact posts 39 on a second commutator 40 located adjacent the rear wall 12 in a chamber 41 back of chamber 36 in the upper part of the casing. Each post 38 of commutator 37 is connected by a wire 42 with a post 39 of commutator 40, and these wirings, by the means later to be described, coordinate and synchronize the record reproduction of the phonograph with the slide display of the visual mechanism. A rotatable slide carrier disc 44 is secured to a hub 45 mounted on a stub shaft 46 which is pinned to a supporting member 47 secured in wall 48 which separates chambers 36 and 41, as clearly shown in Figs. 2 and 3. The wall 48 is provided with an opening 49 in which is located a suitable magnifying optical system 50. The disc 44 is provided with a multiplicity of openings 51 indicated in plan in Fig. 5, corresponding in size to the opening 49 of partition 48 and positioned on the disc relative to the axis of rotation of the disc on shaft 46 so that openings 51 may successively be brought opposite the opening 49 and the lens 50. The number of openings 51 correspond to the number of records presented in the automatic record-changing phonograph, above indicated, and in each of the openings 51 is located a slide carrying the matter which it is desired to have progressively displayed. A display opening 52 is fitted with a ground glass plate 53 located in front of opening 49 and being very much larger and having its dimensions proportional to those of the opening 49 and the lens 50 therein.

Immediately back of opening 49 and spaced therefrom to permit passage of disc 44 between it and opening 49 is a casing member 54 which houses an electric lamp 55 of suitable power and which is operated by means hereinafter described. The casing member 54 is adapted to be closed at its end by a shutter 56 which is operated by a solenoid 57, Fig. 3.

A motor 58 is provided with reduction gearing, not shown, in box 59 by which a shaft 60 is rotated which carries a segment pinion 61 which is adapted to mesh with segment gearing 62 on the slide-carrying disc 44. The shaft 60 also carries a cam disc 63 having thereon a cam 64 adapted to operate a compound switch 65, see Figs. 2 and 5. A commutator arm 66 is mounted to rotate with disc 44 and carries spring-pressed contact head 67 adapted to successively engage the contact posts 39 of the commutator 38.

From the above and having reference to Fig. 5, it will be obvious that each revolution of shaft 60 and segment pinion 61 will move the slide-carrying disc 44 from a position where the gearless portion of pinion 61 engages an untoothed portion 68 of gear 44 to a succeeding untoothed portion 68. These untoothed portions 68 correspond in position to the openings 51 and slides in said openings, so that each revolution of the shaft 60 and segment gear 61 in fact moves the slide-carrying disc 44 so as to take one slide from between light 55 and lens 50, and forward a succeeding slide into that position.

Line wires 69 and 70 provide current for the entire system. The commutator 37 is provided with a contact arm 83, Figs. 4 and 5. It will be noted that in the positions shown, arm 83 is advanced one contact point from the arm 66 so that there is no circuit closed between these arms. This is the position wherein the slide-carrying disc 44 is at rest and the phonograph mechanism has terminated operation and the point has been reached for changing of a phonograph disc and shifting the slide carrier 44 to bring a new slide into position. It will be noted now that wire 69 through switch 71 is in circuit with wire 72 which is in circuit with branch wire 73. This, through branch wire 74 and closed switch 75, connects with a wire 76 which in turn connects with wire 77 and branch wire 78 to motor 58, the current going back through wire 79 to wire 70 and closing the circuit to operate the motor. At the same time wire 77 is connected by wires 80 and 81 through solenoid 57 for operating shutter 56. The motor 58 thus rotates shaft 60 which at the same time moves disc carrier 44 forward one notch and commutator arm forward one notch. Also the cam 64 will have engaged switch arm 82' and closed switch 84'.

Current from line wire 69 will then go through branch wires 73 and 74, through closed switch 75, wire 76, closed circuit 84', and wires 87 and 86 to relay 85; from thence the current goes through wire 84, commutator arm 66, a wire 42, commutator arm 83, and wire 82 to lead-in wire 70. This energizes relay 85 which through armature 88 simultaneously closes switches 89, 90 and 91, and opens switch 75. Since the cycle of operation of the motor has not yet been quite completed the hook-up provides means for continuing operation of the motor. For that purpose current now passes from lead-in wire 69 through shunt wire 91', closed switch 90, wire 74', wire 74, closed switch 89, wire 87, closed switch 84' and wire 76 to branch wire 77 and thence through the motor. When the continued operation of the motor completes its cycle so that cam 64 leaves switch arm 82', permitting the same to return to position indicated in Fig. 5, switch 84 will be opened (at the same time that switch 92 again has been closed), breaking the circuit to the motor and stopping the motor.

This does not, however, deenergize relay 85. For current now passes from lead-in wire 69 through shunt wire 91', wire 90', closed circuit 90, wire 74', wire 74, closed circuit 89 and wire 86 to relay 85. From here wire 84 leads through commutator arm 66, a wire 42 to commutator arm 83, wire 82 to lead-in wire 70. At the same time current is passed through wire 91', closed switch 90, wire 74', wire 73, wire 72 to the amplifier 31 and thence back through wire 70 and branch wire 29' to the record operating mechanism 97 and from there through wire 30', lighting wires 94' and 95 to lead-in wire 70.

An unusual feature of my invention resides in the fact that always, no matter what conditions may have occurred, such as interruption of line circuit, or any other condition, the slide advancing mechanism will always be brought into coordination with the playing of the proper phonograph disc. If the parts are as indicated in Fig. 5, wherein phonograph-controlled commutator arm 83 is always advanced one contact step in relation to slide-disc-controlled commutator arm 66, operation of the motor 58 and of shaft 61 will always have the effect of advancing the slide carrier 44 one notch to advance the space of a single slide and to bring the next succeeding slide into projection position, to be followed by energizing of relay 85 and subsequent stopping of the motor and holding it inoperative during playing of the selected record and projection display from the selected slide.

If, however, for any reason motor 58 is started when commutator arm 61 is even with or behind commutator arm 66, motor 58 will continue to operate until commutator arm 66 reaches a corresponding position with commutator arm 83, at which time the phonograph disc and the slide on slide carrier 44 will be given appropriate relative positions and the termination of the operation of the motor will take place as hereinbefore described. Thus the operations of phonograph and of slide projection are maintained properly synchronized against any possible relative mis-positioning of the commutator arm synchronizing elements.

Meanwhile the record-changing and operating mechanism of the phonograph will have moved the phonograph arm 28 to start playing of a record on the rotating disc 27. The parts will remain in this operative relation until something occurs to break the circuit. This is effected, as shown in Figs. 4 and 5, in the following manner.

A branch wire 99 is connected with lead-in wire 69 and goes to a switch 100. From switch 100 a wire 101 goes to a relay 102, and from there the circuit may be closed through wire 103 to lead-in wire 70. As shown in Figs. 4 and 5, the arm 28 carries to move with it an abutment 98 which at the termination of movement of the arm for completing the playing of the record, engages a switch button 104. This closes switch 100, whereupon relay 102 is energized and through arm 105, Fig. 5, a pawl and ratchet connection 106 moves the commutator arm 83 forward one notch. This breaks the circuit through commutator arms 83, 66 and wires 82, 84 to the relay 85 and restores the parts to the position indicated in Fig. 1, wherein another shift of a record in the phonograph and of a slide on slide carrier 44 takes place.

It will be noted that main lead-in wires 70 and 72 are provided with branch wires 107 and 108 going to the amplifier 31 for connection with the tubes to heat the tubes in a well known manner. It will also be understood that the amplifier, diagrammatically shown in Fig. 5, is of usual construction, operating in the normal way to transfer the vibrations from the phonograph needle to the loud speakers. It will be also noted that through wires 94' and 95 the lamp 55 is lighted—continuously, since it is in circuit with wires 29' and 30' going to the phonograph operating mechanism, which mechanism must always have current, since when it is not playing, it is operative to change the records. Hence, the shutter 56 operated by relay 57 may be employed when a slide is being changed.

A time clock 109 controls the switch 71 through the cam member 110. By suitably proportioning the cam 110 to the clock operation, the period during which the mechanism can be operated, as for nine hours out of twenty-four, from say, 9:00 a. m. to 6:00 p. m., may be accurately determined.

The advantages of my invention will be apparent generally from the foregoing description and from facts applicable thereto. In the practice of my invention the sales promotion campaign which is a principle subject of the invention, will involve general advertising through the means commonly used for that purpose, including periodical, bill-board and radio advertising, or such combinations of advertising as may best fix in the public consciousness certain names, slogans and facts relating to the product being advertised. In conjunction with this general advertising scheme, an apparatus such as heretofore described will be installed in the retail establishments where the product is being sold. Such installation may be effected by renting from the retailer suitable and sufficient space in his establishment for the cabinet to be positioned where retail customers will see it, will see the goods themselves, and will have their attention called to it by the phonograph reproductions, which will have the effect of causing the customer to observe the cabinet and the goods displayed therein and the matter thrown on the ground glass screen from the various slides in the apparatus. The effect of this will be to bring to the mind of the customer, directly in the presence of the goods and the place where he can purchase them, the matter which has been impressed upon him by the general advertising which he has seen or listened to, or both seen and heard. This results in the customer's almost certainly purchasing the article advertised if he is in the retail store for the purpose of purchasing or intending to purchase such an article.

A further advantage of my invention resides in the provision of an attractive and compact display cabinet, which will occupy within a retail store very little more space then ordinary display racks or cabinets, and which, at the same time, will through audible phonographic reproduction and slide display, carry to customers within the store not only a message as to the product being advertised but matters of interest to the customer, which, entirely apart from the fact that the retailer may derive revenue for rental of space for the positioning of the cabinet within his store, will prove attractive to customers and tend to bring them into his establishment.

A further advantage of my invention resides in the fact that simple and effective mechanism is provided whereby the playing of a phonographic record and the display of a visual message are simultaneously effected and the change of each is effected simultaneously and in perfect synchronization.

It will be understood of course that, while the primary purpose of both the visual representation from the slides and the phonographic reproduction will be to convey to the eye and ear of a prospective purchaser the name and essential facts concerning the product which is displayed in the cabinet and has been generally advertised, it will also be true that the slides may be attractive to the eye and the phonographic reproductions will include matter of an entertaining and educational nature such as accompanies the radio programs advertising the particular product which may be the subject of the slide reproductions. In this way, in addition to advertising the product, there will be introduced into the retail establishments where the cabinet is positioned elements of entertainment and of educational value to the customers which may tend to bring customers into the store.

I claim:

1. A sales promotion system which consists in making well known to the public where a product is sold through common advertising mediums such as publications, bill boards, radio and the like, the name and meritorious facts of said product, providing a cabinet in stores for such retail sales to the purchasing public said cabinet having therein means for displaying the product as it is packed for sale, providing in said cabinet a screen window and optical projecting means for displaying said name and facts on said screen, said means including changeable placards, providing in said cabinet phonographic means for audibly reproducing said names and facts, providing means for operating said display means and said phonographic means with electrical timing and stopping and starting means for operating the displaying means and the phonographic means in synchronism, whereby the name of and facts concerning the product given currency to the public by the above noted standard advertising methods will be brought visibly and audibly to the attention of prospective purchasers at the points where and times when they may purchase said product.

2. In a sales promotion system a display cabinet embodying spaces and shelves for holding and displaying a product the name and merits of which have been given public currency by general advertising, a window in said cabinet in proximity to said holding means closed by a ground glass screen, a slide holder carrying a multiplicity of slides projecting means in said cabinet for projecting images of said slides upon said screen, said several slides carrying the name of and facts concerning the product displayed in the cabinet which name and facts have been given public currency by general advertising all arranged on successive slides for successively related display, means for automatically moving the slide holder to bring different slides successively into projecting position in front of said window and screen, and a strong light back of the slides to cause the matter carried by the slides to appear on the screen for repeating in synchronized relation said names and facts.

3. In a sales promotion system a display cabinet embodying spaces and shelves for holding and displaying a product the name and merits of which have been given public currency by general advertising, a window in said cabinet in proximity to said holding means closed by a ground glass screen optical projecting means in said cabinet for projecting images of a slide upon said screen, a slide holder carrying a multiplicity of slides, said several slides carrying the name of and facts concerning the product displayed in the cabinet which name and facts have been given public currency by general advertising all arranged on successive slides for successively related display, means for automatically moving the slide holder to bring different slides successively into projecting position in front of said window and screen, a strong light back of the slides to cause the matter carried by the slides to be projected on the screen for repeating in synchronized relation said names and facts, a phonographic sound reproducing mechanism embodying a multiplicity of records, means for changing said records, and means for terminating that operation and causing the new slide to be held fixed until rendered operative again by termination of sound reproduction by said changed record.

4. In a sales promotion system, a display cabinet embodying means for holding and displaying a product the name and merits of which have been given public currency by general advertising, multiple-record sound reproducing means, a commutator comprising a multiplicity of contact points, a commutator arm in an electric circuit adapted successively to contact said points, multiple slide projection means, a second commutator having the same number of contact points each in electrical circuit with corresponding points of the first commutator, a second commutator arm in an electric circuit adapted successively to contact the points of said second commutator, means for operating the slide projector means to bring a succeeding slide into position, said means simultaneously moving the second commutator arm to contact a point and close a circuit between the two contact arms, means operated by said closed circuit to terminate operation of the slide forwarding means, and means rendered operative by termination of sound reproduction for a record for moving the first commutator arm to contact a succeeding point and thereby to break the circuit between the two commutators and again render operative the slide changing means.

JOHN JAY SMITH.